US005977661A

United States Patent [19]

Kerschenbaum

[11] Patent Number: 5,977,661

[45] Date of Patent: Nov. 2, 1999

[54] SWITCHES AND CIRCUITS FOR SOLENOID CONTROL

[76] Inventor: Sidney Kerschenbaum, 135-60 233rd St., Rosedale, N.Y. 11422

[21] Appl. No.: 09/085,269

[22] Filed: May 26, 1998

[51] Int. Cl.[6] ................................ H01H 1/04; H02B 1/24

[52] U.S. Cl. .......................... 307/112; 307/113; 307/115; 307/116

[58] Field of Search .................................... 307/112, 113, 307/115, 116, 119, 125, 126, 130, 131, 139, 145, 157; 315/222, 225, 226; 361/194, 189, 154, 160; 200/23

[56] References Cited

U.S. PATENT DOCUMENTS

| | | | |
|---|---|---|---|
| 3,571,564 | 3/1971 | Welch | 219/501 |
| 3,708,180 | 1/1973 | Bird | 280/727 |
| 3,721,866 | 3/1973 | McIntosh | 361/195 |
| 4,142,221 | 2/1979 | Jenkins et al. | 361/151 |
| 4,423,336 | 12/1983 | Iverson et al. | 307/64 |
| 4,800,741 | 1/1989 | Kerschenbaum et al. | 70/13 |
| 5,246,258 | 9/1993 | Kerschenbaum et al. | 292/144 |

*Primary Examiner*—Jeffrey Gaffin
*Assistant Examiner*—Peter Zura

[57] ABSTRACT

Switching systems are provided for fail-secure and fail-safe solenoid operated locks, and are designed to maintain the solenoid cool during activation during normal operation when the solenoid is continuously supplied with current. The switching system comprises a dual action switch with electrical contacts providing for momentary high electric power during initial activation of the solenoid operated lock, and also providing a low power continuous current to maintain the solenoid cool during continuous activation. The switching system comprises a push-on, push-off switch, and a normally-open switch connected in series with a transformer and the solenoid operated lock, to provide a high electrical power to the solenoid when both switches are closed. A resistor is connected in parallel with the normally-open switch, such that when the normally-open switch is opened, a low power maintenance current is supplied through the resistor to maintain the solenoid activated with low power to maintain the solenoid cool during continuous activation.

5 Claims, 2 Drawing Sheets

POSITION 'C'

POSITION 'B'

POSITION 'A'

SWITCHES AND CIRCUITS FOR SOLENOID CONTROL

The present invention is described and disclosed in DISCLOSURE DOCUMENT PROGRAM DISCLOSURE DOCUMENT NO. 397865.

BACKGROUND OF THE INVENTION

1. Field of the Invention

The present invention relates generally to switching systems for fail-secure and fail-safe solenoid operated locks, and more particularly pertains to such switching systems which maintain the solenoid cool during activation during normal operation when the solenoid is continuously supplied with current.

2. Discussion of the Prior Art

The present invention was initially developed for use in conjunction with the solenoid operated locks disclosed in Kershenbaum, et al. U.S. Pat. No. 5,246,258 and Kershenbaum, et al. U.S. Pat. No. 4,800,741.

U.S. Pat. No. 5,246,258 describes the operation of prior art fail-safe and fail-secure solenoid-operated locks, which operate in an opposite manner with respect to energization of the solenoid locking or opening the lock. In fail-safe lock assemblies, when the solenoid is energized, the assembly is locked, whereas in fail-secure lock assemblies, when the solenoid is energized, the assembly is open.

SUMMARY OF THE INVENTION

Accordingly, it is a primary object of the present invention to provide switching systems for fail-secure and fail-safe solenoid operated locks which maintain the solenoid cool during activation during normal operation when the solenoid is continuously supplied with current.

BRIEF DESCRIPTION OF THE DRAWINGS

The foregoing objects and advantages of the present invention for switching systems for fail-secure and fail-safe solenoid operated locks may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
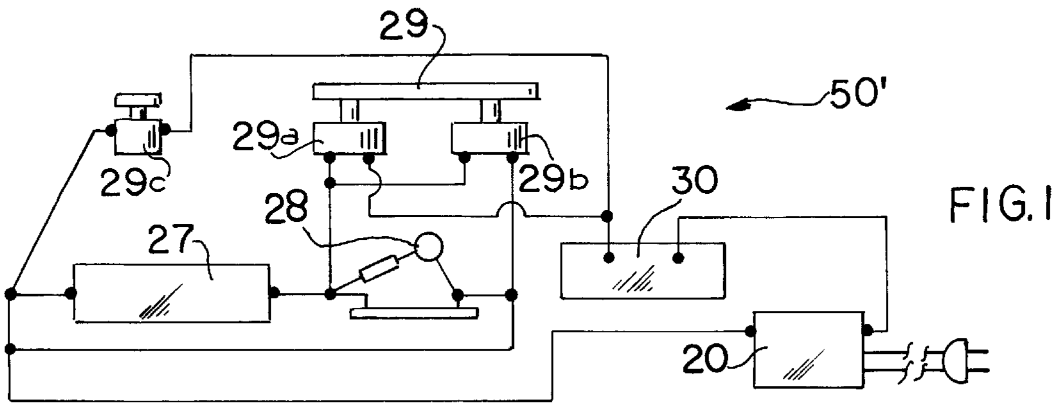
FIG. 1 is a schematic circuit of a first embodiment of the present invention connected to a fail-secure solenoid operated lock.

FIG. 1 illustrates an electrical schematic circuit 50 used with a fail-secure type solenoid operated lock 30. When the pushbutton switch 29 is manually depressed, a push-on, push-off switch 29*a* is initially closed, and a normally-open switch 29*b* is closed. Closed switches 29*a* and 29*b* supply full power to the solenoid in lock 30 through a series circuit comprising a transformer 20, solenoid lock 30, and switches 29*a* and 29*b* to enable the solenoid in lock 30.

When the pushbutton switch 29 is initially depressed, switch 29*b* provides a short circuit around resistor 27 and an indicator lamp 28 to provide full power to the solenoid. After pushbutton switch 29 is released, switch 29*a* remains closed, while switch 29*b* opens, and current then flows through resistor 27 and lamp 28, and the solenoid is maintained enabled by low power through the switch 29*a*, the resistor 27, and lamp 28, lighting the lamp 28, and maintaining the lock 30 in an open-unlocked position.

When the pushbutton 29 is depressed a second time to switch 29*a* to an open position, the lamp 28 and the solenoid of lock 30 are inactivated and the lock 30 is changed to a secure-locked position.

A normally-open switch 29*c* can be momentarily depressed to reactivate the solenoid of the fail-secure lock 30 to momentarily place lock 30 in an open-unlocked position.

Figure 2:
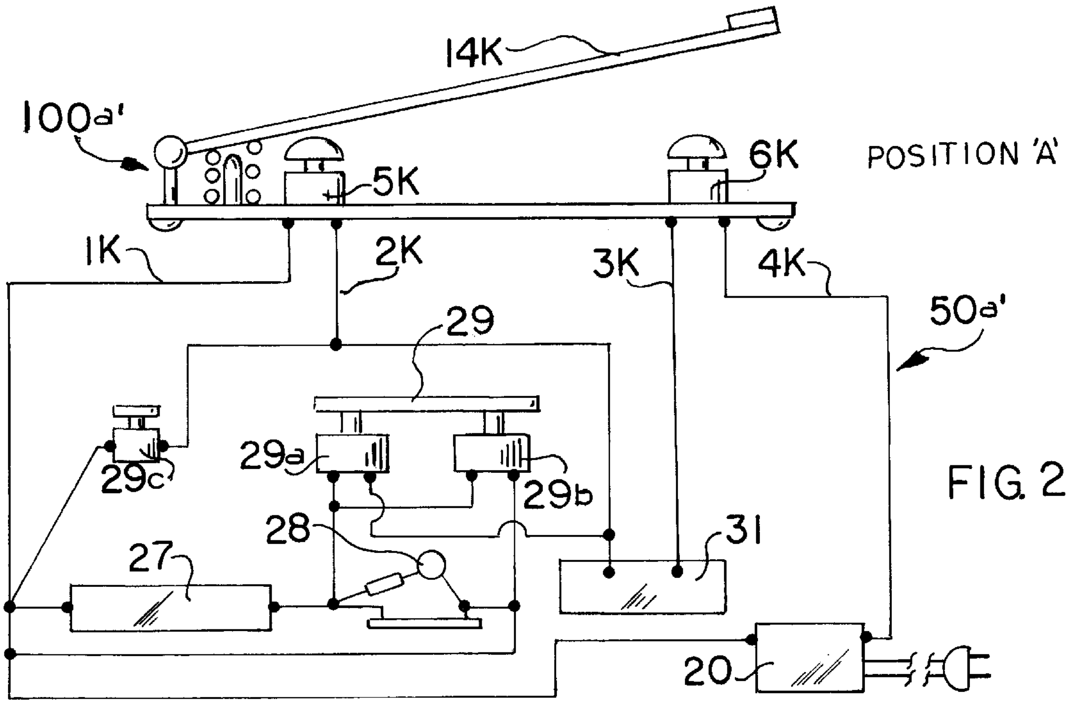
FIG. 2 shows the circuit of FIG. 1 connected to a lever-operated switching device for a fail-safe solenoid lock, and shows the swivel lever device in a position A for supplying continuous low power only to the solenoid.

FIG. 2 shows a second embodiment 50*a* of an electrical circuit which uses a fail-safe solenoid lock 31. As in the first embodiment, when the pushbutton 29 is first depressed and the push-on, push-off switch 29*a* is closed and the normally-open switch 29*b* is also closed momentarily, and full power is supplied through the transformer 20 and switches 29*a* and 29*b* to activate the solenoid in lock 31.

After the pushbutton is released, switch 29*b* is opened, and the solenoid in lock 30 is maintained activated with low power through the switch 29*a*, the resistor 27, and the lamp 28, maintaining the solenoid of lock 31 continuously activated and cool while the lock is maintained in a closed, locked position, and the lamp 28 is also activated.

Figure 4:
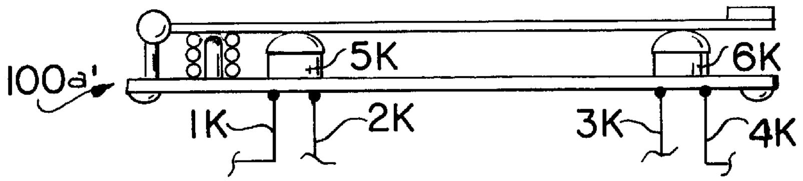
FIG. 4 shows the swivel lever device in a position C for supplying no power to the solenoid.
Figure 3:
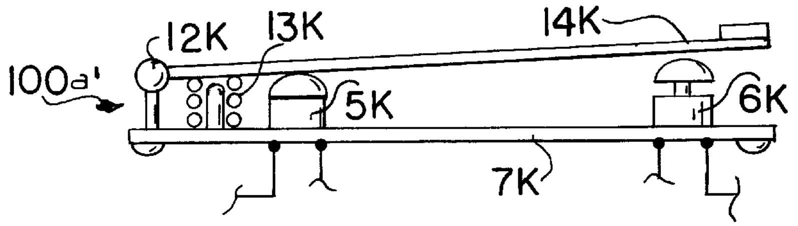
FIG. 3 shows the swivel lever device in a position B for supplying full and low power to the solenoid.

The fail-safe lock 31 can also be conveniently operated by a lever-activated dual switch 100*a*, as illustrated respectively in FIGS. 2, 3 and 4.

FIG. 2 shows the switch 100*a* in a first position A having a normally-open switch 5K in its normally open position and a normally-closed switch 6K in its normally closed position. A control lever 14K is biased upwardly away from the switches 5K,6K by a spring 13K. Assume initially that pushbutton 29 is depressed. The operation is the same as in the first embodiment. The closed switch 6K and closed switches 29*a* and 29*b* allow electrical current to flow through the transformer 20 and resistor 27 to activate the solenoid in lock 31, after which releasing pushbutton 29 opens switch 29*b* and a low maintenance current flows through resistor 27 and lamp 28 and keeps lock 30 cool and in a locked position while the indicator lamp 28 is on.

FIG. 3 shows the switch 100*a* in position B with lever 14K being partially depressed, thus also closing switch 5K and supplying full power to the solenoid operated lock 31.

FIG. 4 illustrates the switch 100*a* in position C with lever 14K fully depressed, closing switch 5K and opening switch 6K. The open switch 6K deactivates the solenoid in 31, placing the lock in an open unlocked position, with lamp 28 off.

Raising the lever 14 from position C (FIG. 4) to position B (FIG. 3) closes switch 6K, reactivating the solenoid in lock 31. Switch 5K is also closed, thereby providing full power to activate the solenoid of lock 31.

Raising the lever 14 further from position B (FIG. 3) to position A (FIG. 2) opens switch 5K, while switch 6K remains closed, allowing the solenoid in lock 31 to remain activated, maintaining the lock in a locked position, with lamp 28 on.

Also in the position of FIG. 2, the pushbutton 29 can be depressed to open switch 29*a*, thus shutting off power to lock 31, when desired. Momentarily depressing normally-open switch 29*c* will temporarily supply full power to the solenoid to momentarily place lock 30 in a locked condition.

Figure 7:
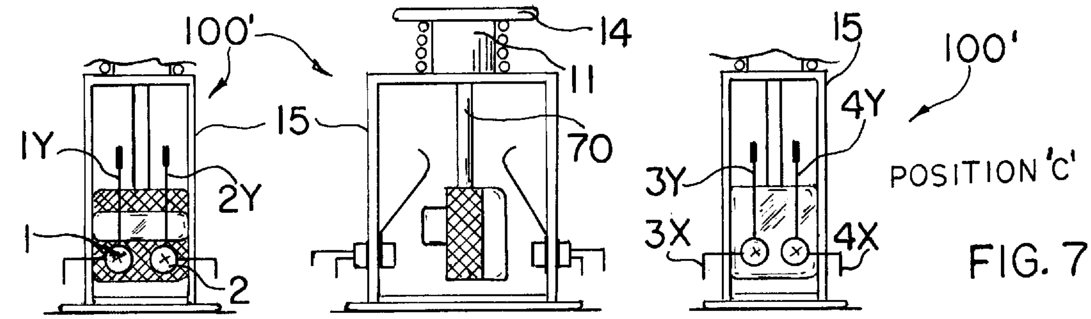
FIG. 7 shows the pushbutton device in a position C for supplying no power to the solenoid.
Figure 6:
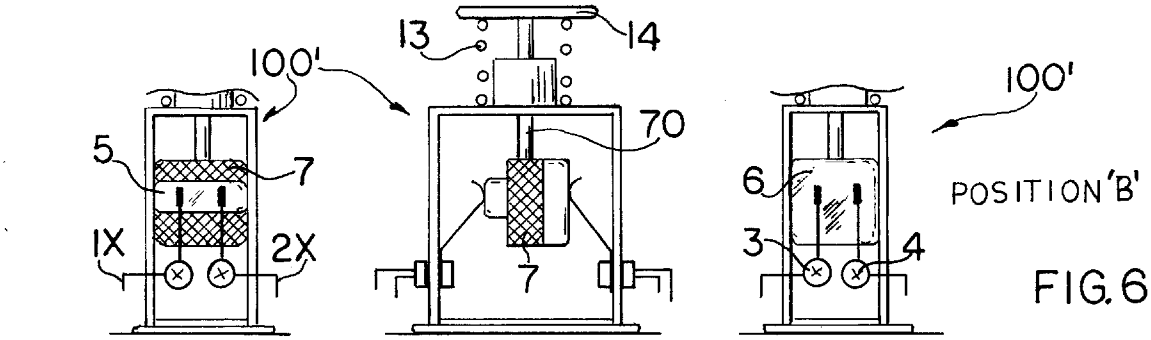
FIG. 6 shows the pushbutton device in a position B for supplying full and low power to the solenoid.
Figure 5:
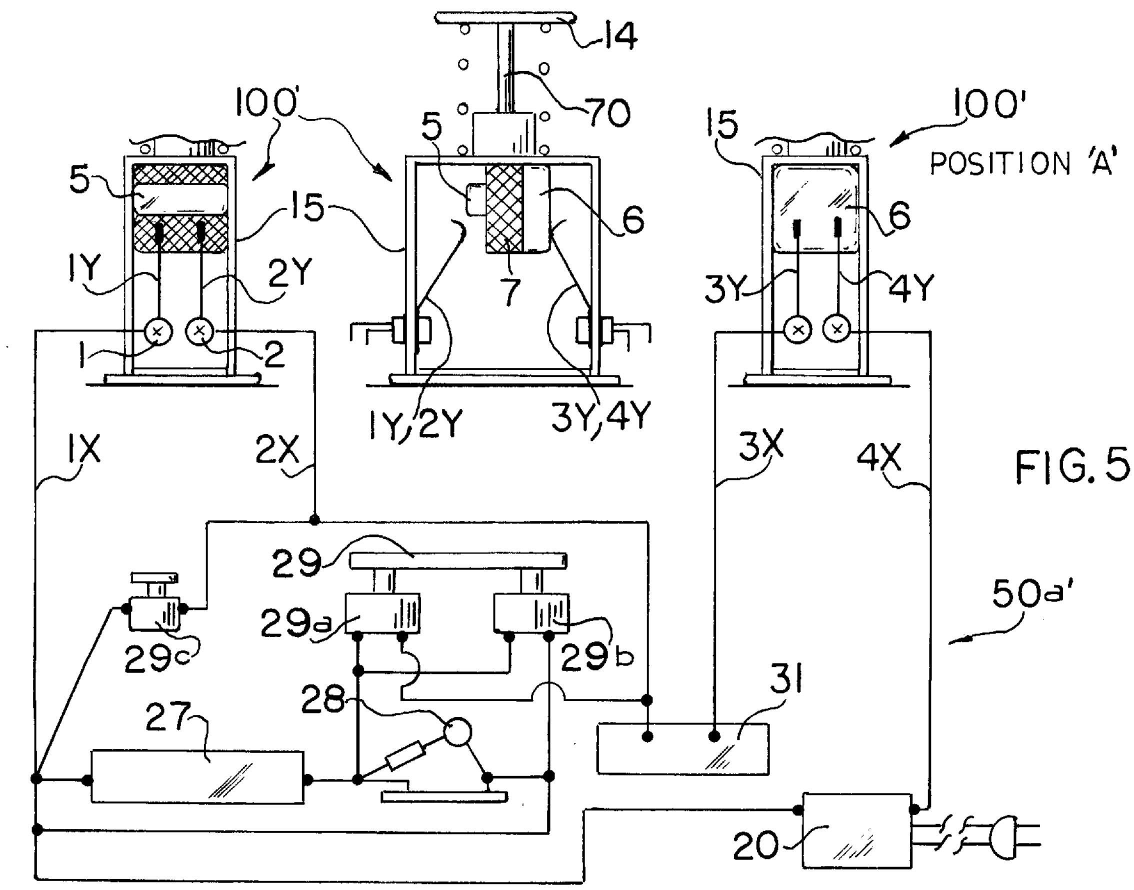
FIG. 5 shows the circuit of FIG. 1 connected to a pushbutton switching device for a fail-safe solenoid operated lock, and shows the device in a position A for supplying continuous low power to the solenoid for fail-safe usage.

FIG. 5 illustrates the electrical circuit 50*a* of FIG. 2 operating with a pushbutton dual control switch device 100' for fail-safe operation, as illustrated in FIGS. 5, 6 and 7.

In this embodiment, switch 100' corresponds to switch 100*a*, and the switches with contacts 5 and 6 correspond respectively to switches 5K and 6K of FIGS. 2–4, as explained herein.

The pushbutton switch assembly 100' is illustrated in each of FIGS. 5, 6 and 7 with a center front view of the switch assembly 100' and separate left and right views of the same switch assembly 100'.

Switch 100' has a slide shaft 70, supported by a bearing 11. Near the bottom of the slide shaft 70, a first narrow left conductor 5 and a second wide right conductor 6 are separated by a central insulator 7. A pushbutton 14 is connected to the top of shaft 70, which is biased upwardly by a spring 13, and is supported on a housing 15.

Switch contacts 1Y, 2Y are provided on the left side of the housing, which are connected by wires 1X, 2X to the electrical circuit 50*a* of FIG. 5. Switch contacts 3Y, 4Y are provided on the right side of housing 15, which are connected by wires 3X, 4X to the electrical circuit 50.

The pushbutton switch assembly 100' is illustrated in each of FIGS. 5, 6 and 7 with a center front view of the switch assembly 100' and separate left and right views of the same switch assembly 100'.

For example, the center front view of switch assembly 100' in FIG. 5 shows right contacts 3Y, 4Y from the front, while the right side view shows contacts 3Y, 4Y being shorted by conductor 6, and thus being closed. Similarly, the center front view of switch assembly 100' in FIG. 5 shows the left contacts 1Y, 2Y from the front, while the left side view shows the contacts 1Y, 2Y not contacting conductor 5, and thus being open. Accordingly, the switch with contact 6 is closed, and the switch with contact 5 is open, and thus operation in position A in FIG. 5 corresponds to operation in position A in FIG. 2, with the switch with contact 5 corresponding to the switch 5K of FIGS. 2–4, and the switch with contact 6 corresponding to switch 6K of FIGS. 2–4.

Similarly, in FIG. 6, the right view of switch assembly 100' shows the switch with contacts 3Y, 4Y closed by conductor 6, and the left view thereof shows the switch with contacts 1Y, 2Y closed by conductor 5. Accordingly, operation in position B in FIG. 6 corresponds to operation in position B in FIG. 3.

Similarly, in FIG. 7, the right view of switch assembly 100' shows the switch with contacts 3Y, 4Y not closed by conductor 6, and the left view thereof shows the switch with contacts 1Y, 2Y not closed by conductor 5. Accordingly, operation in position C in FIG. 7 corresponds to operation in position C in FIG. 4.

While several embodiments and variations of the present invention for switching systems for fail-secure and fail-safe solenoid operated locks are described in detail herein, it should be apparent that the disclosure and teachings of the present invention will suggest many alternative designs to those skilled in the art. For instance, additional lamps can be utilized to further check operations.

What is claimed is:

1. A switching system for a solenoid operated lock, comprising a dual action switch with electrical contacts providing for momentary high electric power activation during initial activation of the solenoid operated lock, and also providing a low power continuous current to maintain the solenoid cool during continuous activation in a circuit comprising a push-on, push-off switch, and a normally-open switch connected in series with a transformer and the solenoid operated lock to provide a high electrical power to the solenoid when both switches are closed, and a resistor connected in parallel with the normally-open switch, such that when the normally-open switch is opened, a low power maintenance current is supplied through the resistor to maintain the solenoid activated with a low power to maintain the solenoid cool during continuous activation.

2. A switching system as claimed in claim 1, wherein the lock is a fail-secure operation lock.

3. A switching system as claimed in claim 1, wherein the lock is a fail-safe operation lock.

4. A switching system as claimed in claim 1, wherein the switching system further includes a normally-open switch and a momentarily operated normally-closed switch.

5. A switching system as claimed in claim 1, further including an indicator lamp for indicating solenoid operation.

* * * * *